(12) United States Patent
Myles et al.

(10) Patent No.: US 7,710,912 B1
(45) Date of Patent: May 4, 2010

(54) MANAGING CONTENT SYNCHRONIZATION BETWEEN A DATA SERVICE AND A DATA PROCESSING DEVICE

(75) Inventors: Philip Myles, Hayward, CA (US); Thomas Saunders, Menlo Park, CA (US); Ron L. A. Theis, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/179,890

(22) Filed: Jul. 11, 2005

(51) Int. Cl.
*H04W 4/00* (2009.01)
*H04M 3/42* (2006.01)

(52) U.S. Cl. ............... 370/328; 370/310; 370/338; 455/414.1; 455/418; 455/550.1; 709/211; 709/203

(58) Field of Classification Search ......... 455/412–414, 455/418–420, 419, 550.1, 550, 414.1; 709/211–220, 709/203, 232; 717/174; 370/328, 338, 310
See application file for complete search history.

(56) References Cited

U.S. PATENT DOCUMENTS

| | | | |
|---|---|---|---|
| 5,126,786 A | 6/1992 | Tanaka | |
| 5,159,592 A | 10/1992 | Perkins | |
| 5,436,960 A | 7/1995 | Campana, Jr. et al. | |
| 5,559,800 A | 9/1996 | Mousseau et al. | |
| 5,594,910 A | 1/1997 | Filepp et al. | |
| 5,625,670 A | 4/1997 | Campana, Jr. et al. | |
| 5,631,946 A | 5/1997 | Campana, Jr. et al. | |
| 5,715,387 A | 2/1998 | Barnstijn et al. | |
| 5,727,202 A | 3/1998 | Kucala | |
| 5,778,176 A | 7/1998 | Geihs et al. | |
| 5,790,974 A | 8/1998 | Tognazzini | |
| 5,802,312 A | 9/1998 | Lazaridis et al. | |
| 5,819,172 A | 10/1998 | Campana, Jr. et al. | |
| 5,915,095 A | 6/1999 | Miskowiec | |
| 5,961,590 A | 10/1999 | Mendez et al. | |
| 5,964,830 A | 10/1999 | Durrett | |
| 6,023,708 A | 2/2000 | Mendez et al. | |
| 6,035,104 A | 3/2000 | Zahariev | |
| 6,035,339 A | 3/2000 | Agraharam et al. | |

(Continued)

FOREIGN PATENT DOCUMENTS

WO    WO 98/36344    8/1998

(Continued)

OTHER PUBLICATIONS

Meggers, J., et al., "A multimedia communication architecture for handheld devices," Personal Indoor and Mobile Radio Communications, 1998. Sep. 8-11, 1998, IEEE, pp. 3 double-sided.

(Continued)

*Primary Examiner*—Lester Kincaid
*Assistant Examiner*—Daniel Lai

(57) ABSTRACT

A system and method for tracking and managing applications and content between a wireless device and a service. For example, in one embodiment, an "uninstalled" field is used within records on a client device and identifying, whether each application on the client is installed or whether the application has been uninstalled. A corresponding set of records are provided on the data service for each individual client device, including the "uninstalled" field. When an application is uninstalled on any client device, the corresponding record for that client device is updated on the service so that the service and the wireless device remain in synch.

19 Claims, 11 Drawing Sheets

U.S. PATENT DOCUMENTS

| | | | |
|---|---|---|---|
| 6,067,451 A | 5/2000 | Campana, Jr. et al. | |
| 6,076,109 A | 6/2000 | Kikinis | |
| 6,134,593 A * | 10/2000 | Alexander et al. | 709/229 |
| 6,151,643 A * | 11/2000 | Cheng et al. | 709/206 |
| 6,151,677 A | 11/2000 | Walter et al. | |
| 6,157,935 A | 12/2000 | Tran et al. | |
| 6,166,734 A | 12/2000 | Nahi et al. | |
| 6,167,441 A | 12/2000 | Himmel | |
| 6,188,752 B1 | 2/2001 | Lesley | |
| 6,199,099 B1 | 3/2001 | Gershman et al. | |
| 6,233,318 B1 | 5/2001 | Picard et al. | |
| 6,289,212 B1 | 9/2001 | Stein | |
| 6,317,592 B1 | 11/2001 | Campana, Jr. et al. | |
| 6,324,691 B1 * | 11/2001 | Gazdik | 709/200 |
| 6,330,618 B1 | 12/2001 | Hawkins et al. | |
| 6,370,687 B1 | 4/2002 | Shimura | |
| 6,396,482 B1 | 5/2002 | Griffin et al. | |
| 6,418,310 B1 | 7/2002 | Dent | |
| 6,449,622 B1 * | 9/2002 | LaRue et al. | 707/201 |
| 6,502,124 B1 * | 12/2002 | Shimakawa et al. | 709/203 |
| 6,622,175 B1 | 9/2003 | Piller | |
| 6,728,685 B1 | 4/2004 | Ahluwalia | |
| 6,785,534 B2 | 8/2004 | Ung | |
| 6,832,230 B1 * | 12/2004 | Zilliacus et al. | 707/203 |
| 6,980,963 B1 | 12/2005 | Hanzek | |
| 7,076,736 B2 | 7/2006 | Hugh | |
| 7,136,635 B1 | 11/2006 | Bharatia et al. | |
| 2001/0029607 A1 * | 10/2001 | Veres et al. | 717/11 |
| 2001/0034712 A1 * | 10/2001 | Colvin | 713/189 |
| 2001/0056508 A1 | 12/2001 | Arneson et al. | |
| 2002/0032768 A1 * | 3/2002 | Voskuil | 709/224 |
| 2002/0083035 A1 | 6/2002 | Pearl et al. | |
| 2002/0103935 A1 | 8/2002 | Fishman et al. | |
| 2002/0132609 A1 | 9/2002 | Lewis et al. | |
| 2002/0194279 A1 | 12/2002 | Chern | |
| 2003/0027554 A1 | 2/2003 | Haumont | |
| 2003/0032417 A1 * | 2/2003 | Minear et al. | 455/419 |
| 2003/0055902 A1 | 3/2003 | Amir et al. | |
| 2003/0081591 A1 | 5/2003 | Cheung et al. | |
| 2003/0088693 A1 | 5/2003 | Cheung et al. | |
| 2003/0115270 A1 | 6/2003 | Funk et al. | |
| 2003/0182380 A1 | 9/2003 | Yabe et al. | |
| 2004/0077347 A1 | 4/2004 | Lauber et al. | |
| 2004/0082323 A1 | 4/2004 | Smith | |
| 2004/0090950 A1 | 5/2004 | Lauber et al. | |
| 2004/0199663 A1 | 10/2004 | Horvitz et al. | |
| 2005/0144251 A1 * | 6/2005 | Slate | 709/203 |

FOREIGN PATENT DOCUMENTS

| | | |
|---|---|---|
| WO | WO 99/06929 | 2/1999 |
| WO | WO 00/30003 | 5/2000 |

OTHER PUBLICATIONS

Bergzen H, "Project Status and System Architecture of an Automated HF System to Be Used by The Swedish Armed Forces," Oct. 28, 2001 IEEE Military Communications Conference, pp. 4 double sided.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting to Network and Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet to Information Appliances" 1999 IEEE Global Telecommunications Conference Globecom 1999, Seamless Interconnection for Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference on World Wide Web, May 11, 1999, pp. 1-14, XP002163485.

"CC/PP Attribute Vocabularies" W3C Jul. 21, 2000, XP002218349.

"Final Office Action", U.S. Appl. No. 11/058,785, (Jan. 26, 2009), 16 pages.

"Non Final Office Action", U.S. Appl. No. 11/058,785, (Jun. 26, 2009), 15 pages.

Excite Home Page, http://www.excite.com/, 1 page Aug. 1, 2000.

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques for Video Browsing, Digital Library Research Group, College of Library and Information Services University of Maryland, pp. 118-125.

Appenzeller, et al.., "User-friendly Access Control for Public Network Ports", IEEE, pp. 699-707, Mar. 1999.

"Final Office Action", U.S. Appl. No. 11/058,785, (Dec. 28, 2009), 13 pages.

* cited by examiner

| User ID Code | Device ID Code | User Name | Online Status | SIM IDs |
|---|---|---|---|---|
| 660098353 | 885985283 | Scott Kister | Online Dispatcher 610 | 1231234 1232389 |
| 6093382528 | 8895285336 | Christopher Desalvo | Online Dispatcher 612 | 3359815 |
| 6825229853 | 8892253825 | Pablo Calamera | Offline | 2231212 |
| ---------- | ---------- | ---------- | ---------- | ---------- |

*Fig. 3*

| | |
|---|---|
| Global ID | 7797827833 |
| Name | Calculator Application |
| Purchase Price | Free |
| Purchase Date | 1/2/05 |
| Size | 4.1K |
| Uninstalled | Y |
| External Ref Field | 675F886 |
| Upgrade | N |
| Service Last Mod | 1/9/05 |
| Device Last Mod | 1/9/05 |

Record 401

Uninstall Bit 500

*Fig. 5*

MANAGING CONTENT SYNCHRONIZATION BETWEEN A DATA SERVICE AND A DATA PROCESSING DEVICE

TECHNICAL FIELD

This application relates generally to the field of wireless data processing systems, and more particularly, to managing content synchronization between a data service and a data processing device.

BACKGROUND

Many portable data processing devices such as wireless personal digital assistants ("PDA") and cellular telephones are capable of processing multimedia content including, for example, digital audio content, music instrument digital interface ("MIDI") audio content (e.g., ring tones), still video images and even motion video. In addition, many Internet service providers today allow subscribers to download multimedia content and applications (e.g., games, utilities, messaging clients, etc) over the data processing device's wireless or terrestrial network connection.

One problem which exists with current systems, however, is that even through many current portable data processing devices are powerful enough to process the multimedia content and applications, the portable devices do not have sufficient non-volatile storage capacity to store a significant amount of multimedia content and/or applications. While current storage technologies such as Flash memory and hard discs have improved significantly in recent years, they are often still inadequate for storing, for example, a user's entire MP3 collection or collection of still pictures or video.

SUMMARY

Techniques are described to track and manage applications and content between a wireless device and a service comprising: maintaining a first plurality of records on the service; each of the first plurality of records corresponding to applications and/or content (hereinafter "applications") purchased by a user, each of the first plurality of records having an "uninstalled" field to indicate whether the applications are uninstalled or installed on the wireless device; maintaining a second plurality of records on the wireless device, including an uninstalled field to indicate whether the applications are uninstalled or installed on the wireless device; receiving input from a user on the wireless device; uninstalling the first application in response to the user input; modifying wireless device in response to the user input; transmitting an indication that the application has been uninstalled to the service; and modifying the uninstall field within the record corresponding to the first application on the service in response to the indication, the service maintaining both the record corresponding to the first application and the application on behalf of the wireless device.

BRIEF DESCRIPTION OF THE DRAWINGS

A better understanding of managing content synchronization between a data service and a data processing device can be obtained from the following detailed description in conjunction with the following drawings, in which:

FIG. 3 illustrates user data stored within a user database at a service according to one embodiment of the invention.

FIG. 5 illustrates a record including an "uninstalled" bit according to one embodiment.

DETAILED DESCRIPTION

Figure 1:
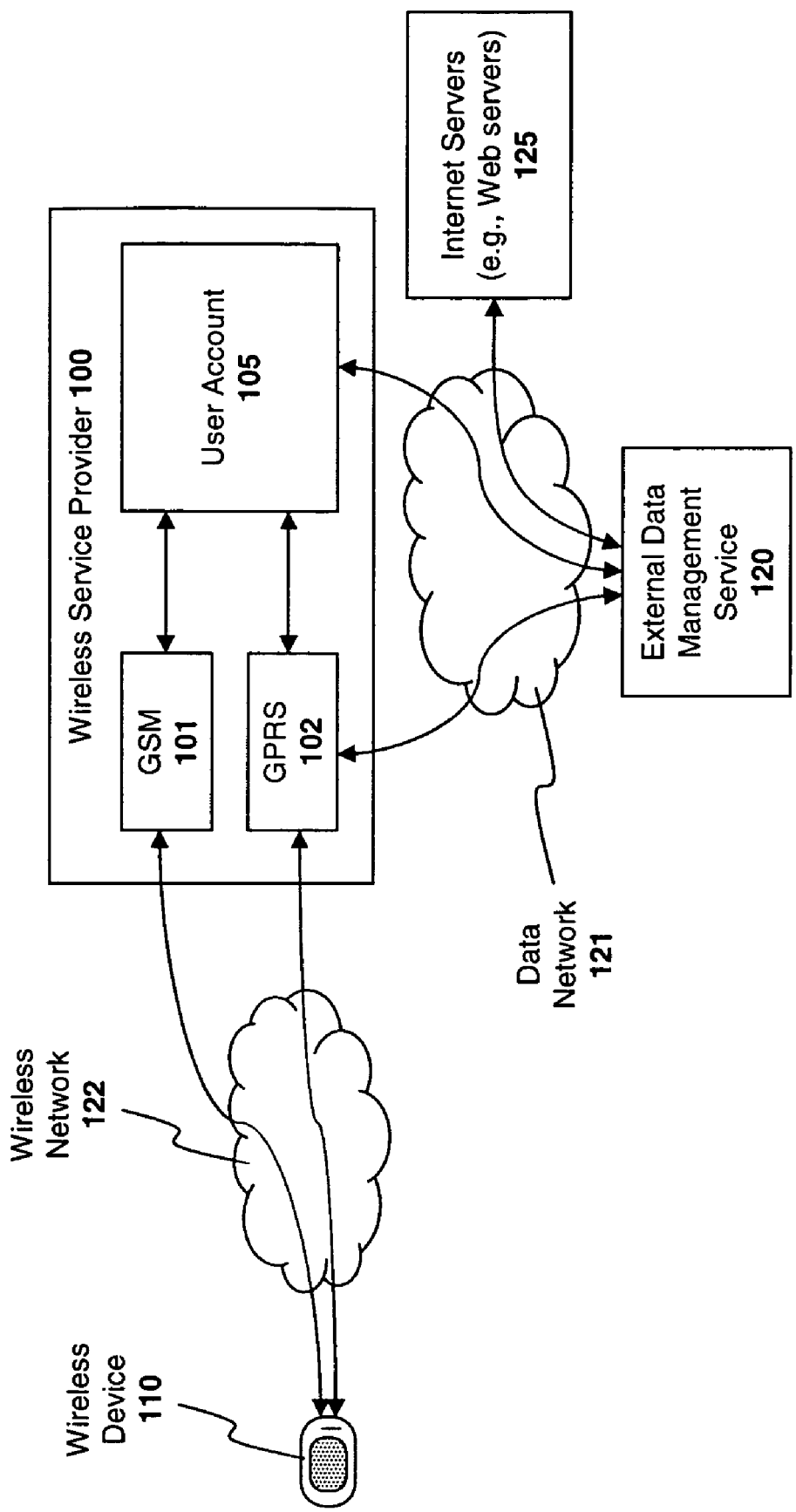
FIG. 1 illustrates a system architecture according to one embodiment of the invention.

Techniques for managing content synchronization between a data service and a data processing device may be implemented on an external data management service 120 such as that illustrated generally in FIG. 1. In one embodiment, the data management service 120 acts as a proxy between a wireless data processing device 110 and any external servers 125 with which the wireless device 110 communicates (e.g. e-mail servers and Web servers). For example, the data management service 120 may convert standard applications, multimedia content and data into a format that the wireless device 110 can properly interpret. One embodiment of the data management service is described in detail in copending application entitled Network Portal System, Apparatus and Method, Ser. No. 09/714,897, filed Nov. 15, 2000, which is assigned to the assignee of the present application and which is incorporated herein by reference. Additional embodiments of the data management service 120 that relate to content synchronization are described below.

In FIG. 1, the wireless network 122 is maintained by the service provider 100 at the physical/data link level of the OSI protocol stack. However, in one embodiment of the invention, policy management for access to data services is managed at the application level by the external data management service 120. Although the embodiment illustrated in FIG. 2 employs the Global System for Mobile Communications ("GSM") 101 for voice traffic and the General Packet Radio Service ("GPRS") 102 for data traffic, it should be noted that the underlying principles of the invention are not limited to any particular voice or data communication standard.

Figure 2:
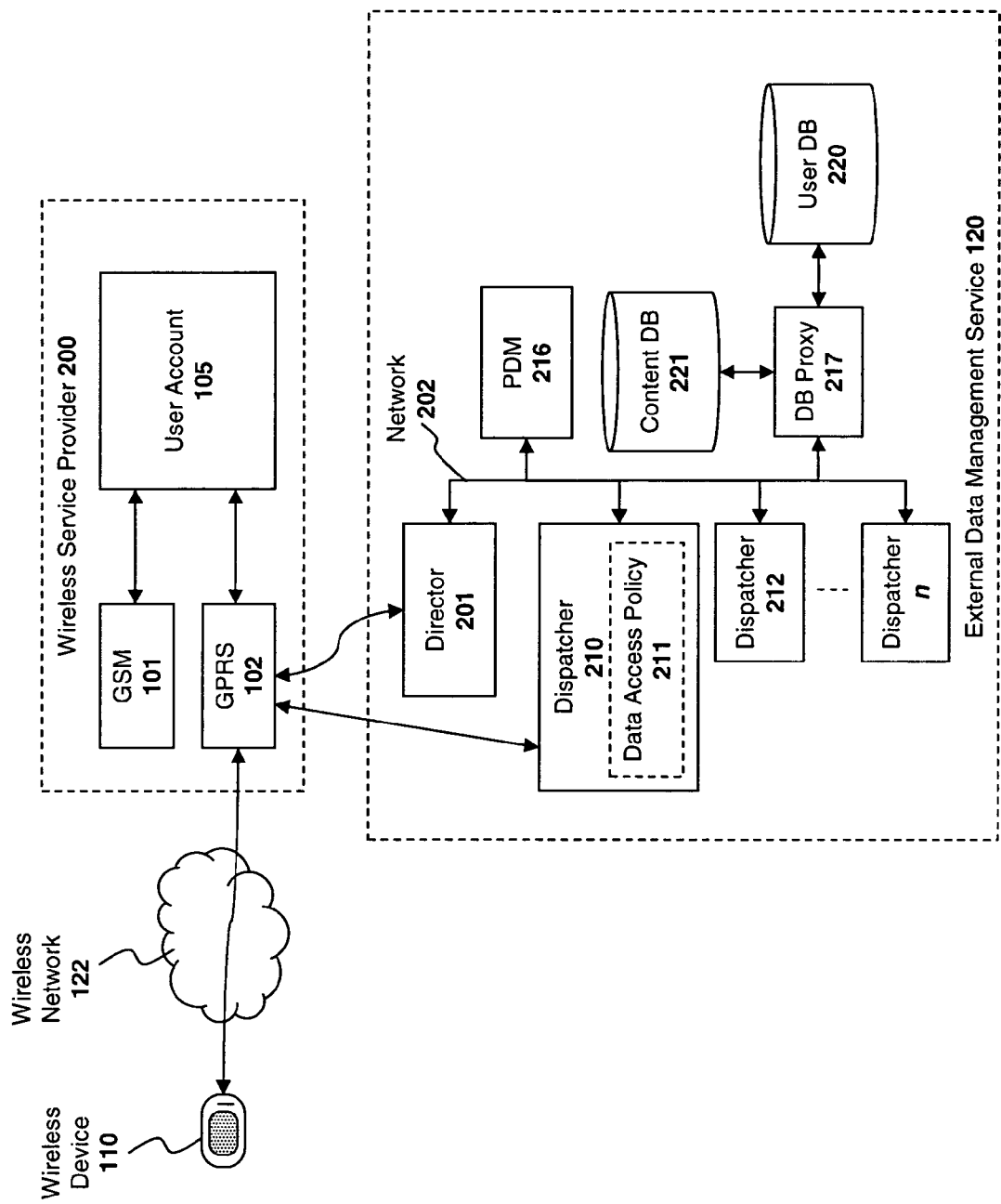
FIG. 2 illustrates a more detailed system architecture according to one embodiment of the invention.

FIG. 2 illustrates additional details associated with one embodiment of the external data management service 120. This embodiment includes a director server 201, a plurality of dispatcher servers 210, 212, . . . n, a premium download manager ("PDM") server 216 and a database proxy server 217, all communicatively coupled to a network 202 (e.g., an Ethernet network). In one embodiment, each of the "servers" is implemented as a separate physical machine. Alternatively, each of the servers may be implemented as server processes within the same physical machine. The underlying principles of the invention remain the same regardless of the specific server implementation used.

In one embodiment, when a wireless device 110 initially attempts to access data services via GPRS 202, the director 201 assigns the wireless device to a particular dispatcher 210. The dispatcher 210 forms the central point of communications and policy management for data transmitted between the wireless device 110 and the service 220. In one embodiment, the dispatcher 210 maintains socket connections (e.g., TCP sockets) between the wireless device 110 and the various servers maintained on the data service 220. For example, as described in greater detail below, to enable content downloading and content synchronization, the dispatcher 210 maintains socket connections between the wireless device 110 and the PDM server 216. Additional details. associated with the communication architecture between the wireless device 110, the dispatcher 210 and the various servers are described in co-pending application entitled SYSTEM AND METHOD FOR MANAGING DATA AND VOICE CONNECTIVITY FOR WIRELESS DEVICES, Ser. No. 11/058,785, filed Feb. 14, 2005 (hereinafter "Data Connectivity Management Application"), which is assigned to the assignee of the present application and which is incorporated herein by reference.

In one embodiment, each time a user logs into or out of the service 220, the dispatcher 210 notifies the DB proxy 217 to update the user's online status within the user database 220 accordingly. In addition, given the significant differences in bandwidth between the wireless network 122 and the local network 202 on which the service 220 operates, the dispatcher 210 may temporarily buffer data transmitted to and from the wireless device 110 over each individual socket connection.

If the physical/data link connection between the wireless device 110 and service provider 200 is temporarily lost (e.g., because the user passes through a tunnel), the user will not immediately be disconnected from the dispatcher. Rather, the user's "online" status will be maintained within the user database 220 for a specified period of time (e.g., 10 minutes), along with an indication of the dispatcher 210 through which the wireless device is connected.

An exemplary portion of the user database 220 is illustrated in FIG. 3, which contains a mapping of user identification codes 301 to data processing device identification codes 302. The user ID/device ID mapping is used by the service 220 to identify the particular wireless device 110 to which data should be transmitted for a given user. In addition, the user database 220 contains the user's account name 303, the user's online status 304, including the particular dispatcher 210 through which the wireless device 110 is communicating, and the Subscriber Identity Module ("SIM") identification codes 305 associated with the user (the user may maintain more than one SIM).

It should be noted that a single table is illustrated in FIG. 5 merely for the purpose of explanation. In operation, however, the database may be a relational database comprised of a plurality of interrelated tables.

As mentioned above, many current portable data processing devices are not equipped with sufficient non-volatile storage capacity (e.g., Flash memory) to handle the amount of multimedia content and/or applications desired by many users. To address this problem, one embodiment provides a unique mechanism for temporarily "uninstalling" multimedia content and applications from the portable data processing device 110 and tracking both the installed and uninstalled content/applications on the data service 120.

Specifically, in one embodiment, the premium download manager ("PDM") 316 controls the distribution and management of the multimedia content and/or applications installed on the portable data processing device. First, the PDM allows users to purchase various types of content and/or applications directly from the wireless device 110. The content may include, by way of example and not limitation, utilities, network clients, new ring tones for the wireless device, graphical images, video and/or encoded audio (e.g., MP3 or AAC files).

Figure 4:
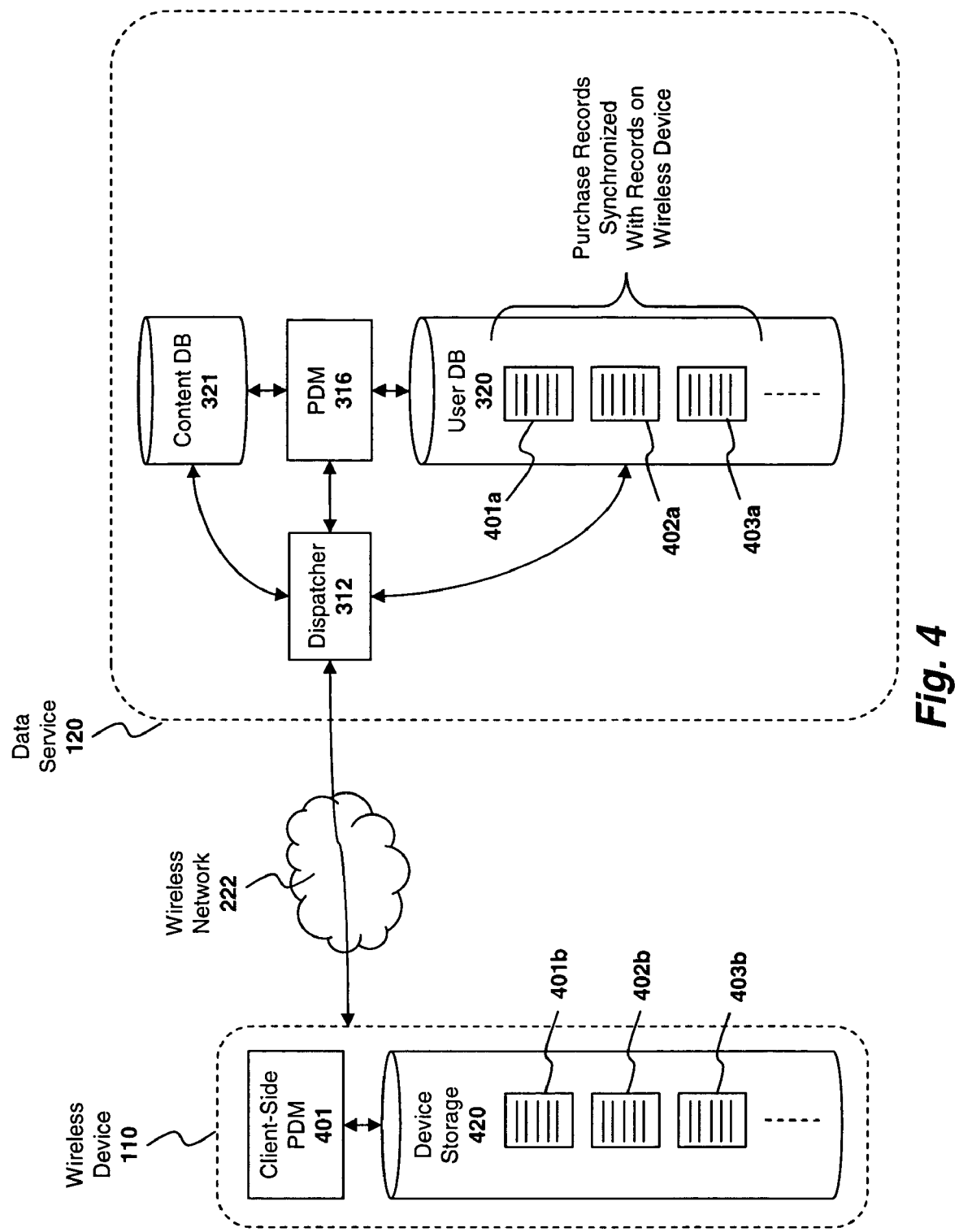
FIG. 4 illustrate a system architecture for managing purchase records according to one embodiment of the invention.

As illustrated in FIG. 4, in one embodiment, the PDM 316 generates and subsequently manages a separate purchase record 401*a*-403*c* for every application and/or piece of content purchased by the user. The actual applications and/or content are stored within a content database 321. In one embodiment, the purchase records 401*a*-403*a* stored in the user database 320 at the data service are synchronized with a corresponding set of purchase records 401*b*-401*c* stored within a storage medium 420 on the wireless device (e.g., Flash memory). In one embodiment, a client-side PDM 401 is executed on the wireless device to communicate with the service-side PDM 316 and manage the synchronization process, as described in greater detail below.

FIG. 5 illustrates the data contained within a purchase record 401 in one embodiment of the invention. In one embodiment, the purchase record 401 includes a "status" field which may be set to any one of many values that represent states of the content that the purchase record represents such as, for example, "uninstalled", or "installed", or "pending" (while the content is being downloaded). In the particular embodiment shown in FIG. 5, an "uninstalled" bit field 500 is provided to indicate whether the application/content referenced by the purchase record has been uninstalled from the data processing device. In one embodiment, the uninstalled field is simply a Boolean value (i.e., a 1 or a 0) which indicates "yes" (the application/content is uninstalled) or "no" (the application/content is installed). As described in detail below, the uninstalled bit field 401 is used as part of the synchronization process.

Other data contained within the purchase record 401 may include a global identification code uniquely identifying the application/content on the service; the name of the application (in this case, "Calculator Application"); the purchase price; the purchase date; the size of the application; an external reference field pointing to the underlying content/application referenced by the purchase record; an indication as to whether the application is an upgrade to a previously-installed application; a "service last modified" date field to indicate when the record was last modified at the service; and a "device last modified" field to indicate when the record was last modified at the device. In one embodiment, these fields are used to determine whether the record has been changed for synchronization purposes. The "device last modified" field is updated whenever any other field in the record is modified, and the modified record is then sent to the service. If for some reason the service never receives the record, the discrepancy will be detected the next time the device and service synchronize with one another because checksums (which, as described below, may be calculated using last modified times) will not match.

Purchase records can be modified on the service first as the result of change made via the service administrators, e.g., through an administrative Web interface used by customer care representatives. Using this Web interface, the customer care representatives may install or remove purchases by making changes directly in the database and pushing the changed records down to the device. The "service last modified" field might be affected by this.

Figure 6:
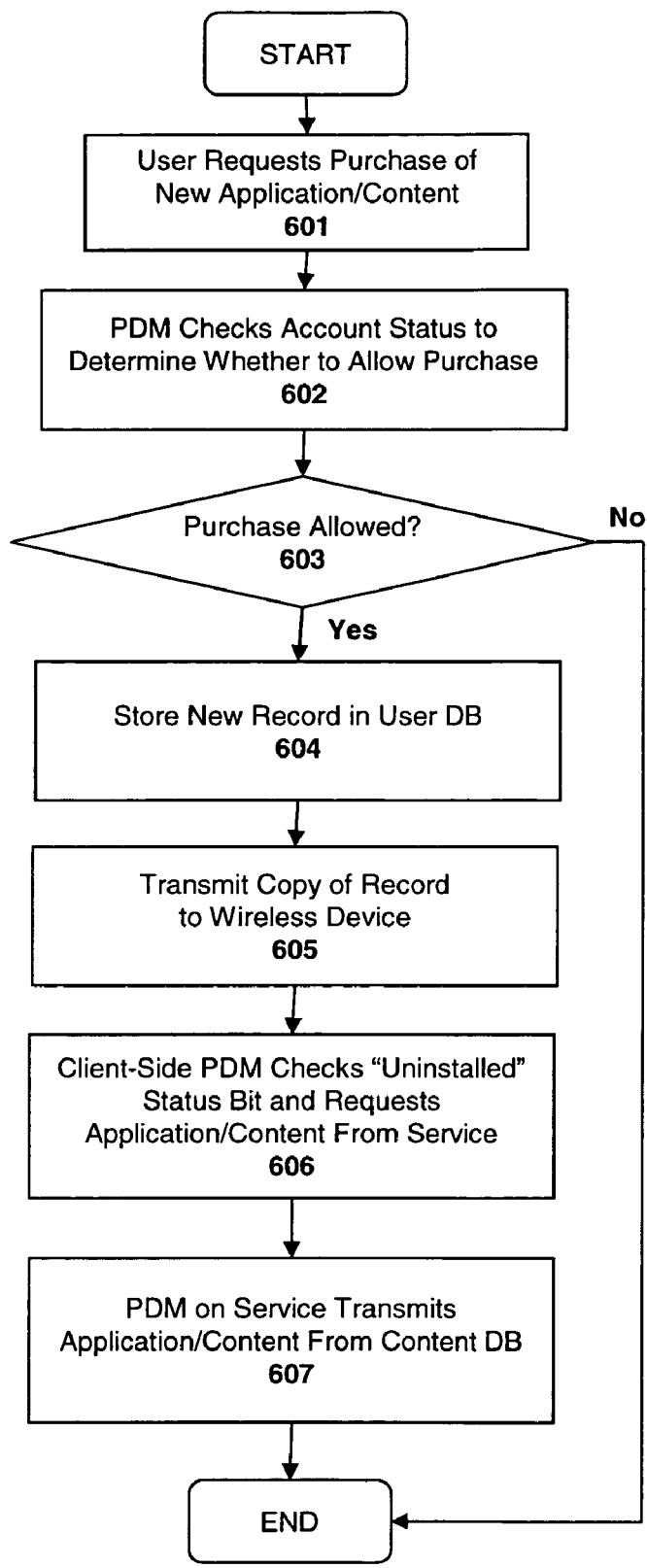
FIG. 6 illustrates a method for purchasing applications and/or content according to one embodiment of the invention.
Figure 7:
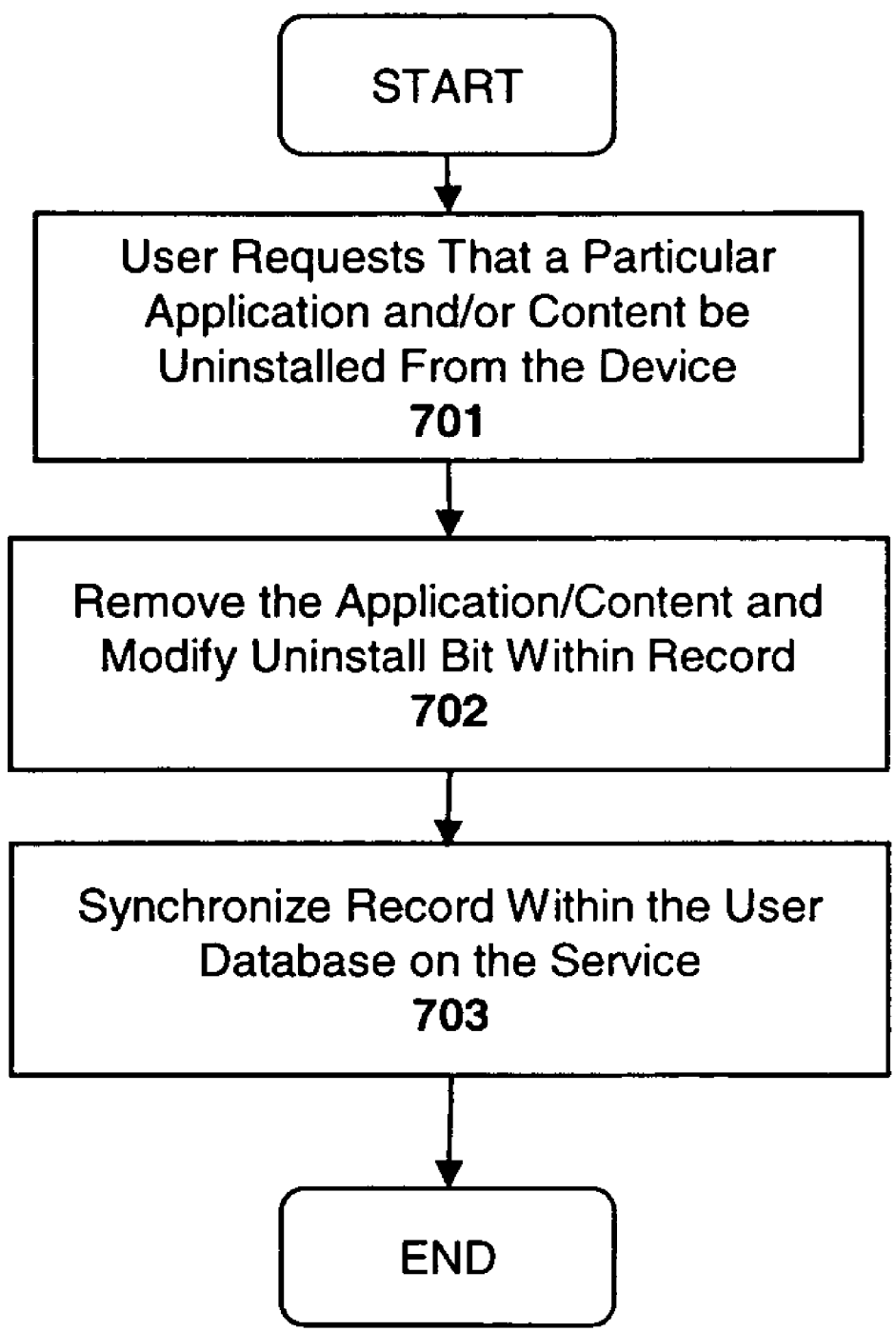
FIG. 7 illustrates a method for uninstalling applications and/or content according to one embodiment of the invention.
Figure 8:
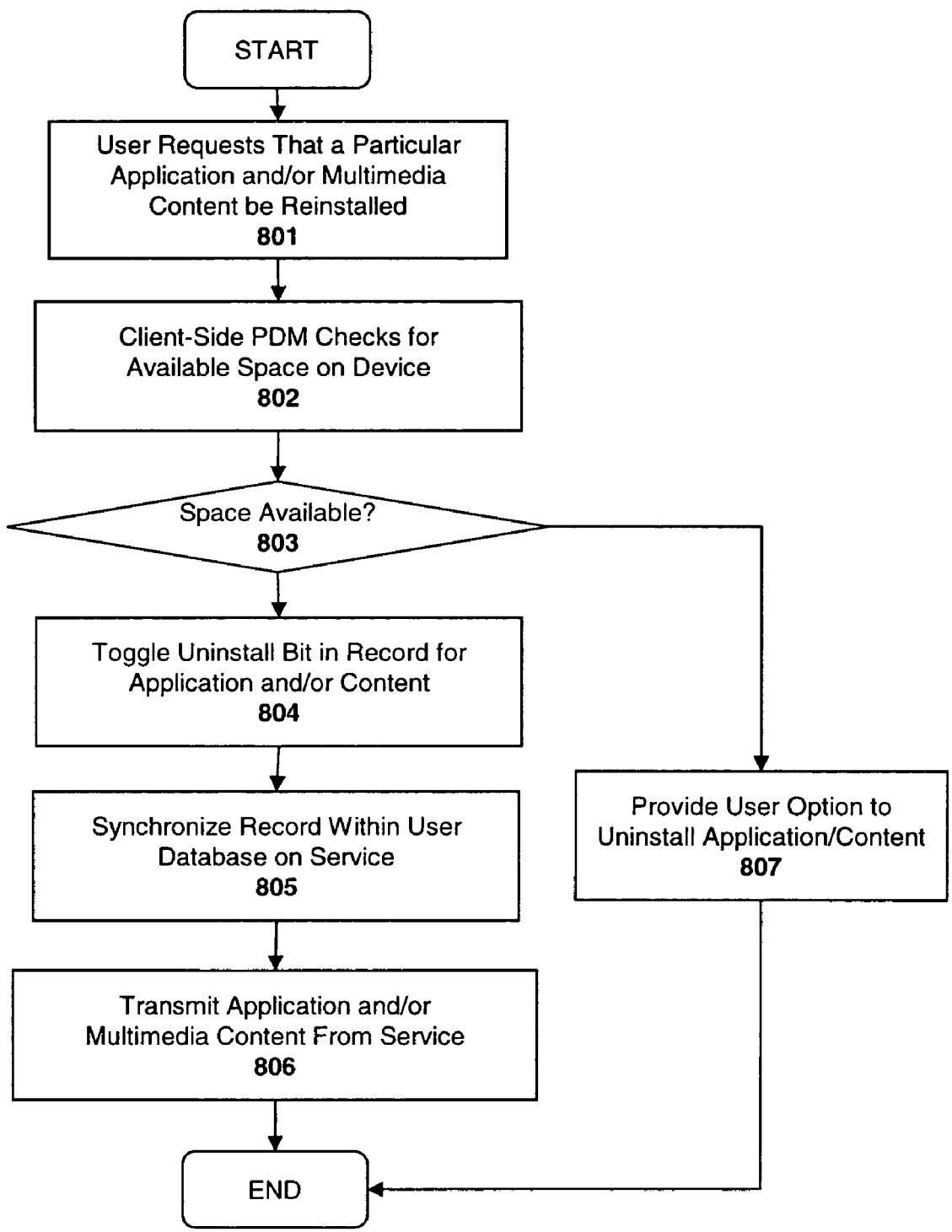
FIG. 8 illustrates a method for reinstalling applications and/or content according to one embodiment of the invention.

FIGS. 6-8 illustrate processes which may be implemented by the architecture illustrated in FIG. 4 to allow the user to purchase new applications/content and to ensure that the purchase records are synchronized between the wireless device and the data service 120.

FIG. 6 illustrates one embodiment of a process for purchasing new content and/or applications. At 601, the user indicates an intent to purchase the new content/application (e.g., via a Web page or other type of online catalog). At 602 the PDM 316 queries the user database 320 to check the user's account status and determine whether the user is authorized to purchase the requested content. If the user is a "prepaid" user (i.e., a user who pre-pays for data services), this may entail communicating with the service provider via a billing server (not shown) to determine if the user's account has sufficient funds for the purchase (as described in the co-pending Data Connectivity Management patent application).

If the purchase is authorized, determined at 603, then at 604 the PDM 316 generates a new record related to the purchase and stores the new record in the user database, initially with the uninstall bit field 500 set to "No" (i.e., indicating that the application/content is going to be installed on the wireless device 110). At 605, a copy of the record is transmitted to the wireless device via the client-side PDM 401. At 606, the client-side PDM 401 checks the uninstalled bit field, determines that the bit field is set to "No," and requests the application/content from the service-side PDM 316. The client-side PDM also stores the new record within the wireless device's non-volatile storage 420. At 607, the service-side PDM 316 transmits the application/content from the content database 321. In the case of an application, the application is then installed on the wireless device 110; in the case of multimedia content, the multimedia content is stored on within the device's non-volatile storage 420.

As mentioned above, after the application/content is installed, the user may choose to temporarily remove it from the wireless device (e.g., because of limited storage space). FIG. 7 illustrates one embodiment of a method for temporarily removing or "uninstalling" the application/content. At 701, the user identifies a particular application and/or multimedia content to be uninstalled from the wireless device 110 (e.g., using the graphical user interface illustrated in FIGS. 10*a-c*). At 702, the client-side PDM 401 removes the application/content from the wireless device 110 and changes the uninstall bit field within the record associated with the application/content to "Yes." At 703, the client side PDM 401 communicates with the service-side PDM 316 to synchronize the changes to the corresponding record in the user database 320. In one embodiment, rather than transmitting the entire record to the service-side PDM 316, the client-side PDM 401 merely transmits an indication of the change made to the record (i.e., the switch from "No" to "Yes" within the "uninstalled" bit field 500). In one embodiment, the same synchronization techniques as those used in co-pending application entitled A System and Method for Managing Data Objects in a Wireless Device (Filed Oct. 1, 2002, Ser. No. 10/263,147) are used to perform the synchronization between the records 401*b*-403*b* and 401*a*-403*a*, on the wireless device 110 and the data service 120, respectively. However, the underlying principles of the invention are not limited to those synchronization techniques.

One of the benefits of the foregoing configuration is that both the wireless device and the service effectively track all of the applications and/or multimedia content that the user is authorized to use on his/her wireless device (i.e., that the user has rightfully purchased, or which was given away free). Thus, at any subsequent point in time, the user may easily reinstall a particular application or multimedia file on the wireless device 110, as illustrated in FIG. 8. At 801, the user identified a particular application and/or multimedia file to be reinstalled (e.g., using the GUI shown in FIG. 10*a-c*). At 802, in response to the user request, the client-side PDM 401 initially checks to determine if enough space is available on the wireless device. As mentioned above, in one embodiment, the size of each application and/or content file is stored within each of the records (even the records of uninstalled applications/content).

If enough space is available, determined at 803, then at 804, the client-side PDM 401 changes the uninstall bit field from a "Yes" to a "No" and, at 805, synchronizes the change with the corresponding record stored within the user database 320 of the data service 120. At 806, the service-side PDM 316 transmits the application/content from the content database 321. Once again, in the case of an application, the application is then installed on the wireless device 110; in the case of multimedia content, the multimedia content is stored on within the device's non-volatile storage 420.

Returning to 803, if the space on the data processing device is insufficient, the user is presented with the option (e.g., via a user interface such as that described below) to uninstall another application or content before the new content is downloaded at 807.

In addition to the reinstallation scenario described above, because the current state of the user's applications and content is maintained within the user database 320 on the service 120, if the wireless device 110 is lost or stolen, or if records or associated applications and multimedia content on the wireless device are somehow lost, the user's applications and multimedia content may be identified by the service 120 and reinstalled on the wireless device 110.

Figure 9:
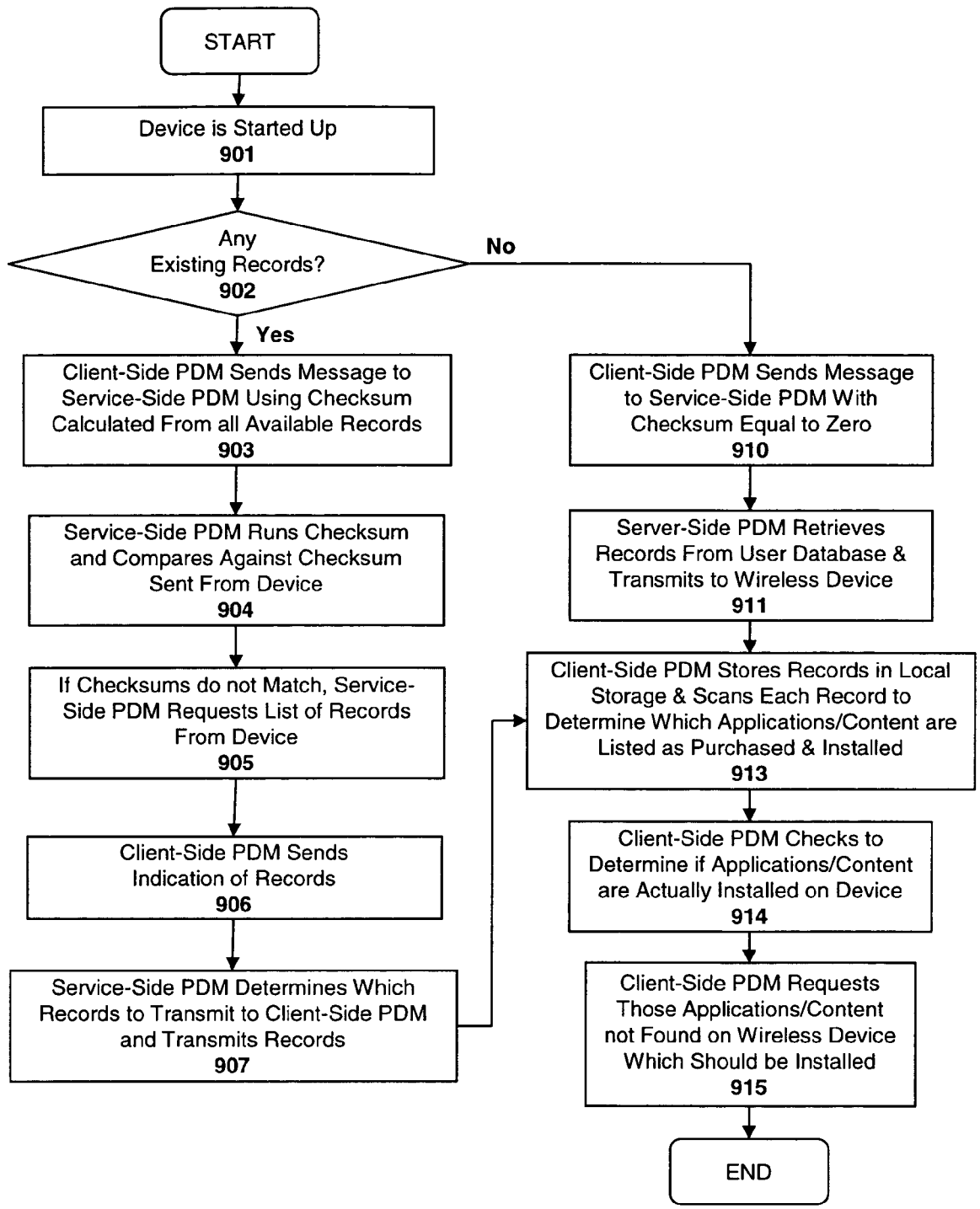
FIG. 9 illustrates a method for synchronizing records according to one embodiment of the invention.

One embodiment of a method for restoring the installed applications/content on a wireless device is set forth in FIG. 9. At 901, the device is started up. At 902, the client-side PDM 401 determines whether any records for applications and/or content exist on the device. If some records exist, then the client-side PDM 401 sends a message to the service-side PDM 316 containing a checksum calculated from all records available on the wireless device 110. In one embodiment, the checksum is calculated using certain specified fields within the records such as, for example, each record's global ID, service last modified and device last modified fields. In addition, in one embodiment, the checksum is calculated using the Adler-32 encryption algorithm. However, the underlying principles of the invention are not limited to using any particular set of records or any particular checksum.

At 904, the service-side PDM 316 runs the same checksum on the records stored within the user database 320. If the checksums match, then the device and the service are synchronized and the process ends. However, at 905, if the checksums do not match, then the service-side PDM 316 requests a list of records from the wireless device 110. At 906, the client-side PDM 401 sends the list of records to the service. In one embodiment, the list includes the global ID, service last modified and device last modified fields for each records and/or the checksum calculated from these fields.

At 907, the service-side PDM compares each record in the list with the records stored in the user database to identify those records to send to the wireless device. At 913, the client-side PDM 401 stores the records and scans each record to determine which ones indicate that the application/content is purchased and installed. At 914, the client-side PDM 401 checks to determine whether the applications/content are actually installed. In one embodiment, it sends a request to the operating system software executed on the wireless device to make this determination. Finally, at 915, the client-side PDM 401 requests those applications/content which should be installed on the device, but which are not.

At 902, if the client-side PDM 401 determines that no records for applications and/or content on the device (e.g., in the event all the records have been lost or the user purchased a new device), then at 910, the client-side PDM sends a message to the service-side PDM with an indication that no records exist. In one embodiment, this is accomplished by using a checksum equal to zero. At 911, the service-side PDM 316 retrieves all of the user's records from the user database and transmits them to the service-side PDM. The process then continues from 913 as described above.

Figure 10A:
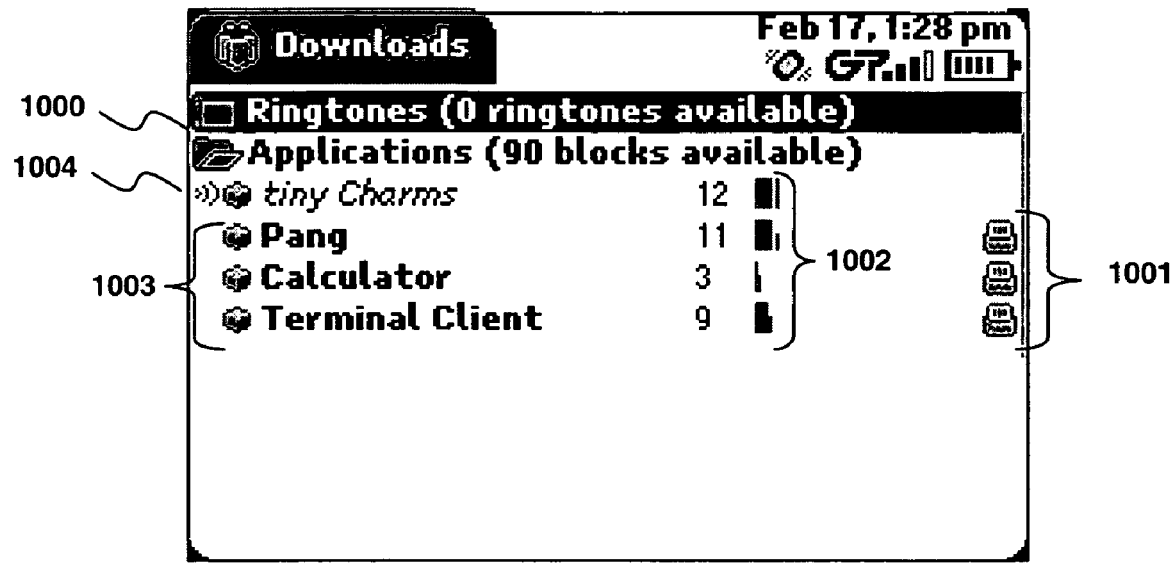
FIGS. 10a-c illustrate a graphical user interface according to one embodiment of the invention.
Figure 10B:
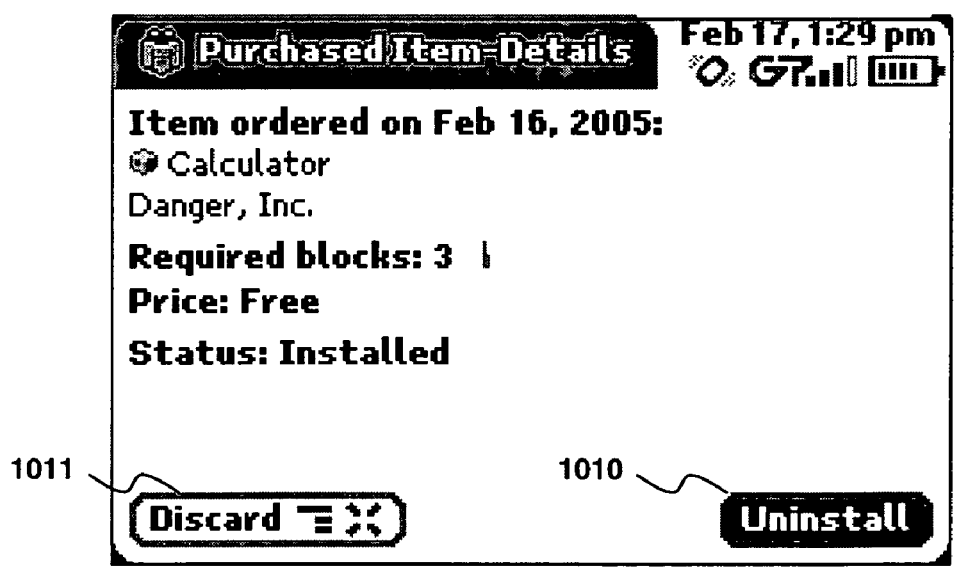
Figure 10C:
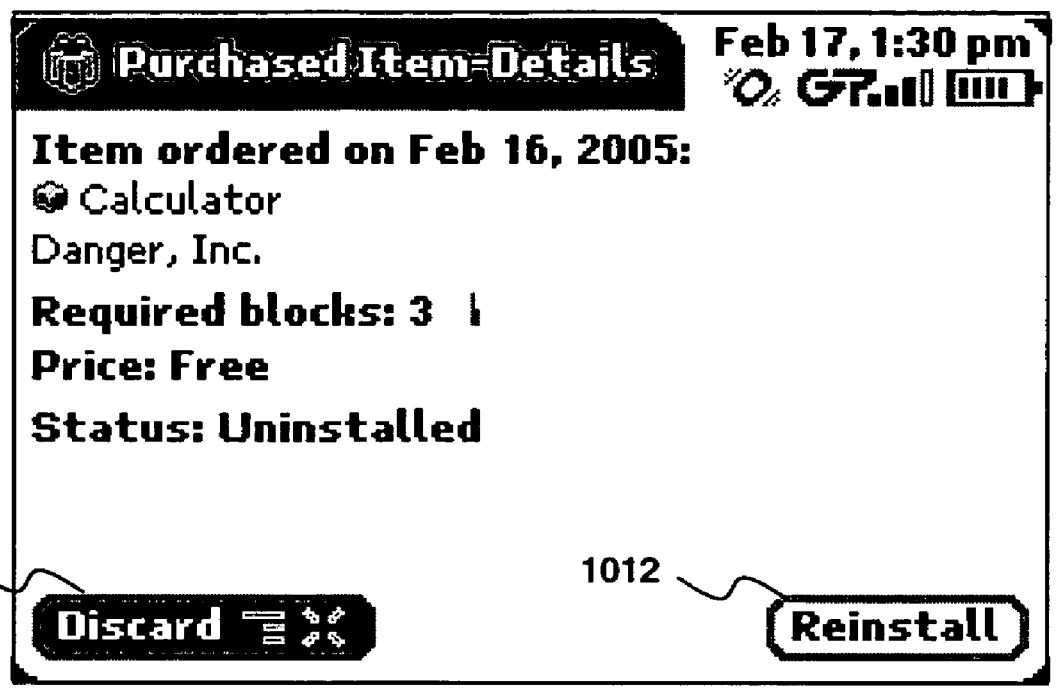

One embodiment of a user interface for managing installed and uninstalled applications is illustrated in FIGS. 10a-c. FIG. 10a shows a list of folders 1000. Each folder in the list contains a certain type of application or multimedia content. In the specific example shown in FIG. 10a, the folders include a "ringtones" folder (containing a list of ringtones installed on the device) and an "applications" folder (containing a list of applications installed on the device). The applications folder is opened, thereby exposing a list of installed applications. For each application, a graphic 1001 is provided which indicates whether the application is installed or uninstalled from the system. In the example, a group of applications 1003 are installed and one particular application 1004 is uninstalled. In addition, graphics 1002 are provided to indicate the amount of storage space consumed by each application.

The user may select each application using a mouse or cursor control device and generate a window such as that shown in FIG. 10b or 10c. If the application is installed, a button 1010 is provided to allow the user to uninstall the application and a separate button 1011 is provided to allow the user to discard the application completely. If the application is discarded, no record of the application will be maintained within the user database (i.e., the application will be unrecoverable). If the application is uninstalled, a button 1012 is provided to allow the user to reinstall the application as described herein. Once again, a separate button 1011 is provided to allow the user to discard the application completely.

Although the same records 401-403 are stored on the wireless device 110 and the service 120 in the embodiments described above, the records may not necessarily be stored in the same format. For example, in one embodiment, the records 401-403 are stored on the data service 120 in a standard SQL database format, whereas the records may be stored on the wireless device in a format compatible with the file system employed on the wireless device 110 or in a proprietary binary format. However, the underlying principles of the invention are not limited to the particular format used to store the records.

The embodiments of the invention described herein may be particularly useful in cases where the wireless device 110 is only capable of communicating with the data service, and not another type of storage device such as a personal computer (i.e., where the user may back up his/her applications and/or content). However, the underlying principles of the invention are not limited to this configuration.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although each of the functional modules illustrated in FIG. 3 is described herein as a separate "server," it will be readily apparent to those of skill in the art that the functional modules may be grouped within a single server or spread across multiple servers while still complying with the underlying principles of the invention. Accordingly, the scope and spirit of the invention should be judged in terms of the claims which follow.

What is claimed is:

1. A computer implemented method comprising:

assigning a wireless device to an assigned dispatcher among multiple dispatchers of a service and maintaining a connection between the wireless device and the service for communication over a wireless network;

responsive to a loss of the connection, maintaining both a pointer identifying the assigned dispatcher and an online status for the wireless device at the service for a specified period of time to enable the wireless device to reconnect to the service via the assigned dispatcher;

causing a first plurality of records to be maintained at the service, each of the first plurality of records associated with the wireless device and corresponding to applications for which authorization to install, uninstall and reinstall the applications on the wireless device has been previously purchased, each of the first plurality of records having an uninstalled field to indicate whether the applications were previously installed but are currently uninstalled or are currently installed on the wireless device;

causing a second plurality of records to be maintained on the wireless device, the second plurality of records also corresponding to the applications for which authorization to install, uninstall and reinstall the applications on the wireless device has been previously purchased, each of the second plurality of records including an uninstalled field to indicate whether the applications were previously installed but are currently uninstalled or are currently installed on the wireless device;

communicating with the wireless device to synchronize the first plurality of records that are maintained at the service with the second plurality of records that are maintained at the wireless device;

receiving a first indication that a first application is to be downloaded to the wireless device;

in response to the first indication, determining that storage space on the wireless device is insufficient to store the first application, wherein the wireless device is configured to display a selectable control to temporarily uninstall a second application that is stored on the wireless device;

receiving input from the wireless device via the wireless network to temporarily uninstall the second application from the wireless device to provide the storage space for the first application to be downloaded;

receiving a second indication that the second application has been temporarily uninstalled from the wireless device in response to the input, the uninstalled field within a record corresponding to the second application being modified within the second plurality of records on the wireless device;

causing the uninstalled field within the record corresponding to the second application within the first plurality of records on the service to be modified in response to the second indication;

causing the second application to be maintained for reinstallation onto the wireless device; and in response to the second indication that the second application has been temporarily uninstalled, automatically causing the first application to be installed on the wireless device.

2. The method as in claim 1 further comprising:

receiving a third indication from the wireless device to reinstall the second application; and transmitting the second application from the service to the wireless device to cause the second application being reinstalled on the wireless device.

3. The method as in claim 2 further comprising causing the uninstalled field on the records corresponding to the second application on both the wireless device and the service to be updated to indicate that the second application is installed on the wireless device.

4. The method as in claim 1 wherein the applications comprise ringtones.

5. The method as in claim 1 wherein the applications comprise program code executable on the wireless device.

6. The method as in claim 1 wherein each of the records includes a global ID code uniquely identifying an associated one of the applications, a service last modified field indicating the last time the record was modified at the service and a device last modified field indicating the last time the record was modified at the wireless device.

7. The method as in claim 1 wherein the uninstalled field comprises a bit field with a first value representing an uninstalled state for the second application and a second value representing an installed state for the first application.

8. A system comprising:

a database on a service for storing data;

a service-side download manager configured to cause a first plurality of records to be maintained on the database, each of the first plurality of records associated with a wireless device and corresponding to applications for which authorization to install, uninstall and reinstall the applications on the wireless device has been previously purchased, each of the first plurality of records having an uninstalled field to indicate whether the applications were previously installed but are currently uninstalled or are currently installed on the wireless device;

the service-side download manager further configured to synchronize the first plurality of records with a second plurality of records that are caused to be maintained by a client-side download manager on the wireless device, the second plurality of records also corresponding to the applications for which authorization to install, uninstall and reinstall the applications on the wireless device has been previously purchased, the second plurality of records including an uninstalled field to indicate whether the applications were previously installed but are currently uninstalled or are currently installed on the wireless device;

the database configured to, responsive to a loss of the connection, maintain both a pointer identifying a dispatcher and an online status for the wireless device at the service for a specified period of time to enable the wireless device to reconnect via the dispatcher, the dispatcher being assigned to the wireless device from among multiple dispatchers of the service to maintain a connection between the wireless device and the service for communication over a wireless network;

the client-side download manager configured to determine whether sufficient storage space exists on the wireless device to download and install a first application;

in response to a determination of insufficient storage space, the wireless device is configured to display a selectable control to temporarily uninstall a second application that is stored on the wireless device to provide storage space for the first application;

the client-side download manager further configured to temporarily uninstall the second application, modify the uninstalled field within a record corresponding to the second application on the wireless device, transmit an indication to the service-side download manager that the second application has been uninstalled; and the service-side download manager further configured to, upon receiving the indication, modify the uninstalled field within the record corresponding to the second application on the service, cause the second application to be maintained for reinstallation onto the wireless device, and automatically cause the first application to be installed on the wireless device.

9. The system as in claim 8 wherein, in response to receiving an indication to reinstall the second application from the client-side download manager, the service-side download manager is further configured to cause the second application to be transmitted to the wireless device to be reinstalled by the client-side download manager on the wireless device.

10. The system as in claim 9 wherein the service-side download manager and the client-side download manager are both further configured to update the uninstalled field on the records corresponding to the second application on both the wireless device and the service to indicate that the second application is installed on the wireless device.

11. The system as in claim 8 wherein the database is an SQL database and wherein the records are stored on the wireless device within a flash memory.

12. The system as in claim 8 wherein the applications comprise ringtones.

13. The system as in claim 8 wherein the applications comprise program code executable on the wireless device.

14. The system as in claim 8 wherein each of the records includes a global ID code uniquely identifying an associated one of the applications, a service last modified field indicating the last time the record was modified at the service and a device last modified field indicating the last time the record was modified at the wireless device.

15. The system as in claim 8 wherein the uninstalled field comprises a bit field with a first value representing an uninstalled state for the application and a second value representing an installed state for the application.

16. One or more computer readable storage media comprising instructions that are executable to implement a service that is configured to:

initiate records to be maintained on the service, each of the records being associated with a wireless device and corresponding to applications for which authorization to install, uninstall and reinstall the applications on the wireless device has been previously purchased;

assign the wireless device to an assigned dispatcher among multiple dispatchers of the service and maintain a connection between the wireless device and the service for communication over a wireless network;

responsive to a loss of the connection, maintain both a pointer identifying the assigned dispatcher and an online status for the wireless device at the service for a specified period of time to enable the wireless device to reconnect to the service via the assigned dispatcher;

synchronize the records with additional records maintained by the wireless device, the additional records corresponding to the applications for which the authorization to install, uninstall, and reinstall the applications on the wireless device has been previously purchased;

receive a request to download and install a first application onto the wireless device, wherein the wireless device is configured to display a selectable control to temporarily uninstall a second application that is stored on the wireless device in response to a determination of insufficient storage space for the first application;

receive an indication that the second application has been temporarily uninstalled from the wireless device to provide the storage space for the first application to be downloaded; and in response to the indication received from the wireless device that the application has been uninstalled from the wireless device:

initiate the records to be modified to indicate that the second application has been uninstalled from the wireless;

cause the first application to be downloaded to the wireless device; and initiate the second application to be maintained for reinstallation onto the wireless device.

17. One or more computer readable storage media as recited in claim 16, wherein the service is further configured to:

receive a third indication from the wireless device to reinstall the second application; and transmit the second application to the wireless device to be reinstalled on the wireless device.

18. One or more computer readable storage media as recited in claim 16, wherein the applications comprise ringtones.

19. One or more computer readable storage media as recited in claim 16, wherein the applications comprise program code executable on the wireless device.

* * * * *